United States Patent
Hosseini et al.

(10) Patent No.: US 11,848,772 B2
(45) Date of Patent: Dec. 19, 2023

(54) RATE-MATCHING PATTERN INDICATIONS FOR SIDELINK CARRIER AGGREGATION

(71) Applicant: QUALCOMM Incorporated, San Diego, CA (US)

(72) Inventors: Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 17/193,782

(22) Filed: Mar. 5, 2021

(65) Prior Publication Data
US 2022/0286224 A1   Sep. 8, 2022

(51) Int. Cl.
| H04L 1/00 | (2006.01) |
| H04W 72/04 | (2023.01) |
| H04W 72/23 | (2023.01) |
| H04W 72/0453 | (2023.01) |
| H04W 92/18 | (2009.01) |

(52) U.S. Cl.
CPC .......... *H04L 1/0013* (2013.01); *H04W 72/23* (2023.01); *H04W 72/0453* (2013.01); *H04W 92/18* (2013.01)

(58) Field of Classification Search
CPC ............................ H04L 1/0013; H04W 72/23
USPC ......................................................... 370/329
See application file for complete search history.

(56) References Cited

U.S. PATENT DOCUMENTS

| 2020/0092062 A1* | 3/2020 | Yum ...................... H04L 5/0053 |
| 2020/0220669 A1* | 7/2020 | Park ...................... H04L 1/1864 |
| 2022/0022150 A1* | 1/2022 | Khoryaev ........... H04W 56/002 |
| 2022/0086860 A1* | 3/2022 | Panteleev ............... H04W 4/40 |
| 2022/0191875 A1* | 6/2022 | Panteleev ............. H04L 5/0053 |
| 2022/0201654 A1* | 6/2022 | Lee ........................ H04L 1/1864 |

FOREIGN PATENT DOCUMENTS

| EP | 3672133 A1 | 6/2020 | |
| KR | 20200114971 A | * 8/2019 | ............. H04W 4/70 |
| TW | 202105944 A | * 2/2021 | ........... H04L 1/1812 |
| WO | 2020222568 A1 | 11/2020 | |

OTHER PUBLICATIONS

International Search Report and Written Opinion—PCT/US2022/070156—ISA/EPO—dated Apr. 11, 2022.

* cited by examiner

*Primary Examiner* — Faisal Choudhury
(74) *Attorney, Agent, or Firm* — Harrity & Harrity, LLP

(57) ABSTRACT

Various aspects of the present disclosure generally relate to wireless communication. In some aspects, a first user equipment (UE) may receive an indication of a rate-matching pattern associated with shortened transmission lengths for a plurality of sidelink component carriers in a sidelink carrier aggregation. The UE may perform a sidelink transmission to a second UE with a shortened transmission length on a sidelink component carrier of the plurality of sidelink component carriers based at least in part on the rate-matching pattern. Numerous other aspects are described.

30 Claims, 14 Drawing Sheets

RATE-MATCHING PATTERN INDICATIONS FOR SIDELINK CARRIER AGGREGATION

FIELD OF THE DISCLOSURE

Aspects of the present disclosure generally relate to wireless communication and to techniques and apparatuses for rate-matching pattern indications for sidelink carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first UE includes receiving an indication of a rate-matching pattern associated with shortened transmission lengths for a plurality of sidelink component carriers in a sidelink carrier aggregation; and performing a sidelink transmission to a second UE with a shortened transmission length on a sidelink component carrier of the plurality of sidelink component carriers based at least in part on the rate-matching pattern.

In some aspects, a method of wireless communication performed by a first UE includes receiving an indication of a rate-matching pattern associated with shortened transmission lengths for a plurality of sidelink component carriers in a sidelink carrier aggregation; and receiving, from a second UE, a sidelink transmission with a shortened transmission length on a sidelink component carrier of the plurality of sidelink component carriers based at least in part on the rate-matching pattern.

In some aspects, a first UE for wireless communication includes a memory and one or more processors operatively coupled to the memory, the memory and the one or more processors configured to: receive an indication of a rate-matching pattern associated with shortened transmission lengths for a plurality of sidelink component carriers in a sidelink carrier aggregation; and perform a sidelink transmission to a second UE with a shortened transmission length on a sidelink component carrier of the plurality of sidelink component carriers based at least in part on the rate-matching pattern.

In some aspects, a first UE for wireless communication includes a memory and one or more processors operatively coupled to the memory, the memory and the one or more processors configured to: receive an indication of a rate-matching pattern associated with shortened transmission lengths for a plurality of sidelink component carriers in a sidelink carrier aggregation; and receive, from a second UE, a sidelink transmission with a shortened transmission length on a sidelink component carrier of the plurality of sidelink component carriers based at least in part on the rate-matching pattern.

In some aspects, a non-transitory computer-readable medium storing a set of instructions for wireless communication includes one or more instructions that, when executed by one or more processors of a first UE, cause the first UE to: receive an indication of a rate-matching pattern associated with shortened transmission lengths for a plurality of sidelink component carriers in a sidelink carrier aggregation; and perform a sidelink transmission to a second UE with a shortened transmission length on a sidelink component carrier of the plurality of sidelink component carriers based at least in part on the rate-matching pattern.

In some aspects, a non-transitory computer-readable medium storing a set of instructions for wireless communication includes one or more instructions that, when executed by one or more processors of an a first UE, cause the first UE to: receive an indication of a rate-matching pattern associated with shortened transmission lengths for a plurality of sidelink component carriers in a sidelink carrier aggregation; and receive, from a second UE, a sidelink transmission with a shortened transmission length on a sidelink component carrier of the plurality of sidelink component carriers based at least in part on the rate-matching pattern.

In some aspects, a first apparatus for wireless communication includes means for receiving an indication of a rate-matching pattern associated with shortened transmission lengths for a plurality of sidelink component carriers in a sidelink carrier aggregation; and means for performing a sidelink transmission to a second apparatus with a shortened transmission length on a sidelink component carrier of the plurality of sidelink component carriers based at least in part on the rate-matching pattern.

In some aspects, a first apparatus for wireless communication includes means for receiving an indication of a rate-matching pattern associated with shortened transmission lengths for a plurality of sidelink component carriers in a sidelink carrier aggregation; and means for receiving, from a second apparatus, a sidelink transmission with a shortened transmission length on a sidelink component carrier of the plurality of sidelink component carriers based at least in part on the rate-matching pattern.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
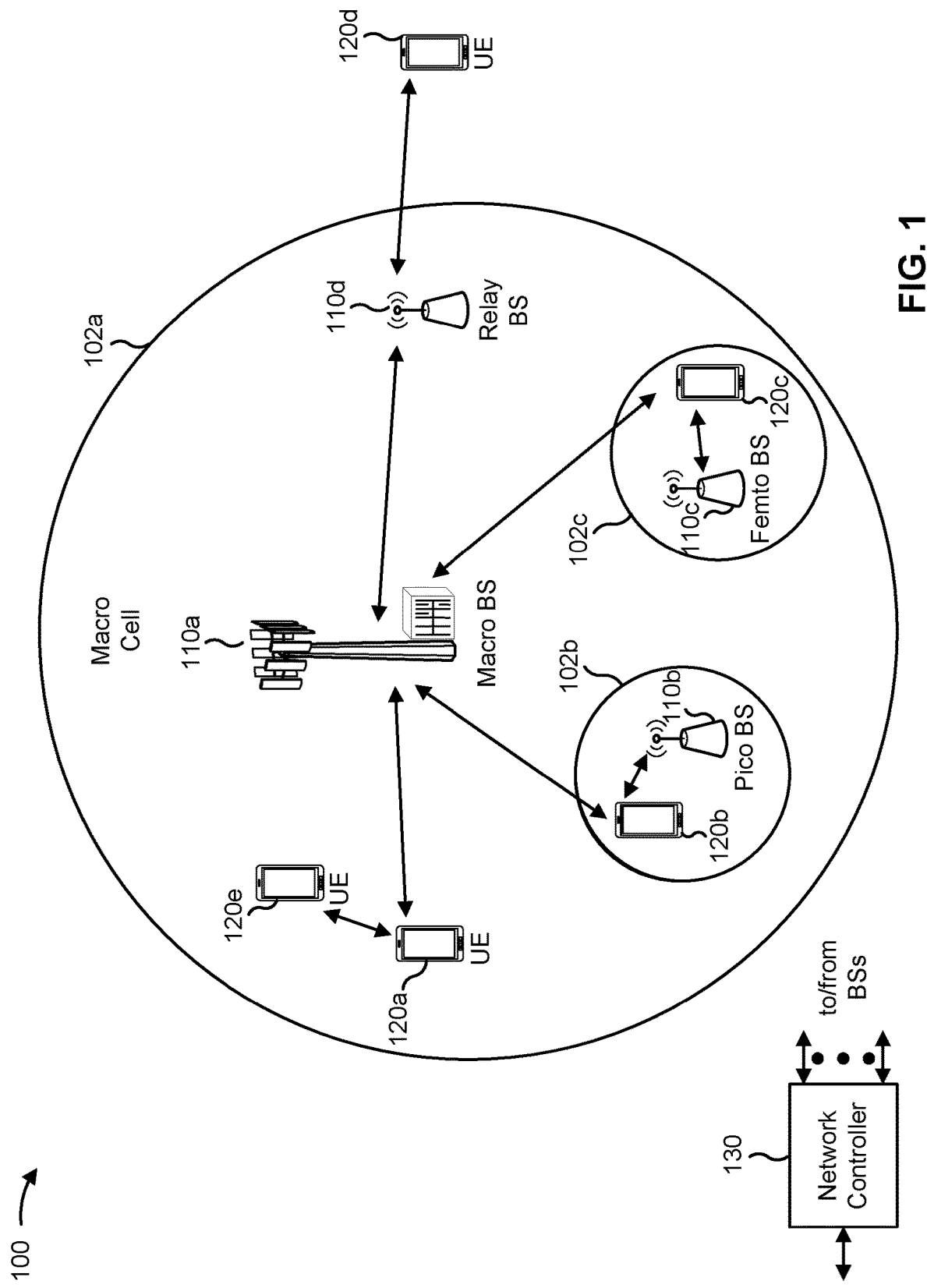
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
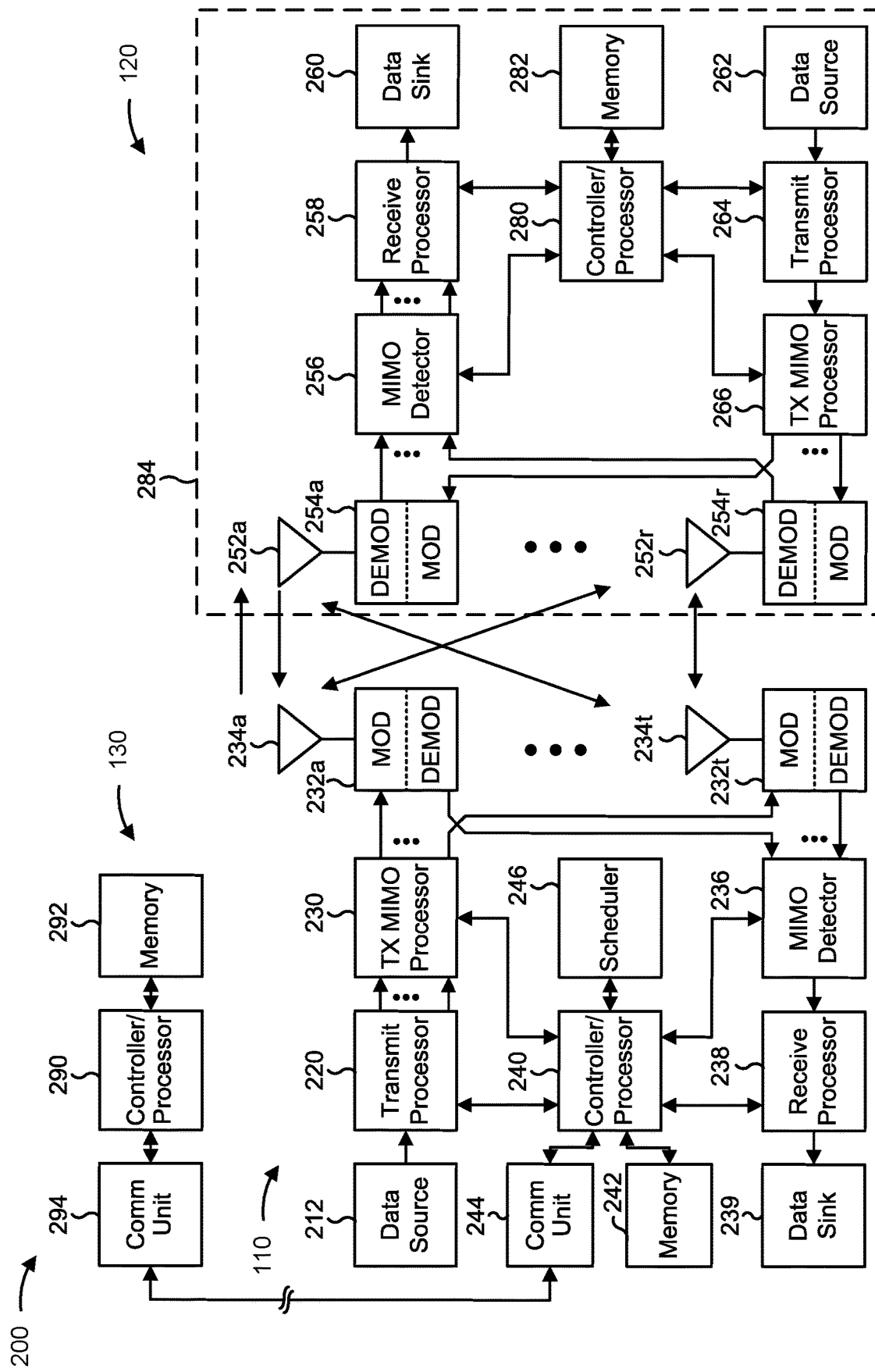
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 8-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 8-11).

Controller/processor 240 of base station 110, controller/processor 280 of UE 120, and/or any other component(s) of FIG. 2 may perform one or more techniques associated with rate-matching pattern indications for sidelink carrier aggregation, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, a first UE (e.g., UE 120a) includes means for receiving an indication of a rate-matching pattern associated with shortened transmission lengths for a plurality of sidelink component carriers in a sidelink carrier aggregation; and/or means for performing a sidelink transmission to a second UE (e.g., UE 120e) with a shortened transmission length on a sidelink component carrier of the plurality of sidelink component carriers based at least in part on the rate-matching pattern. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for transmitting, to the second UE, the indication of the rate-matching pattern along with the sidelink transmission via a bit field in sidelink control information based at least in part on a Mode 2 resource allocation.

In some aspects, a first UE (e.g., UE 120e) includes means for receiving an indication of a rate-matching pattern associated with shortened transmission lengths for a plurality of sidelink component carriers in a sidelink carrier aggregation; and/or means for receiving, from a second UE (e.g., 120a), a sidelink transmission with a shortened transmission length on a sidelink component carrier of the plurality of sidelink component carriers based at least in part on the rate-matching pattern. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for receiving the indication from a base station; and/or means for receiving the indication from the base station via a third UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
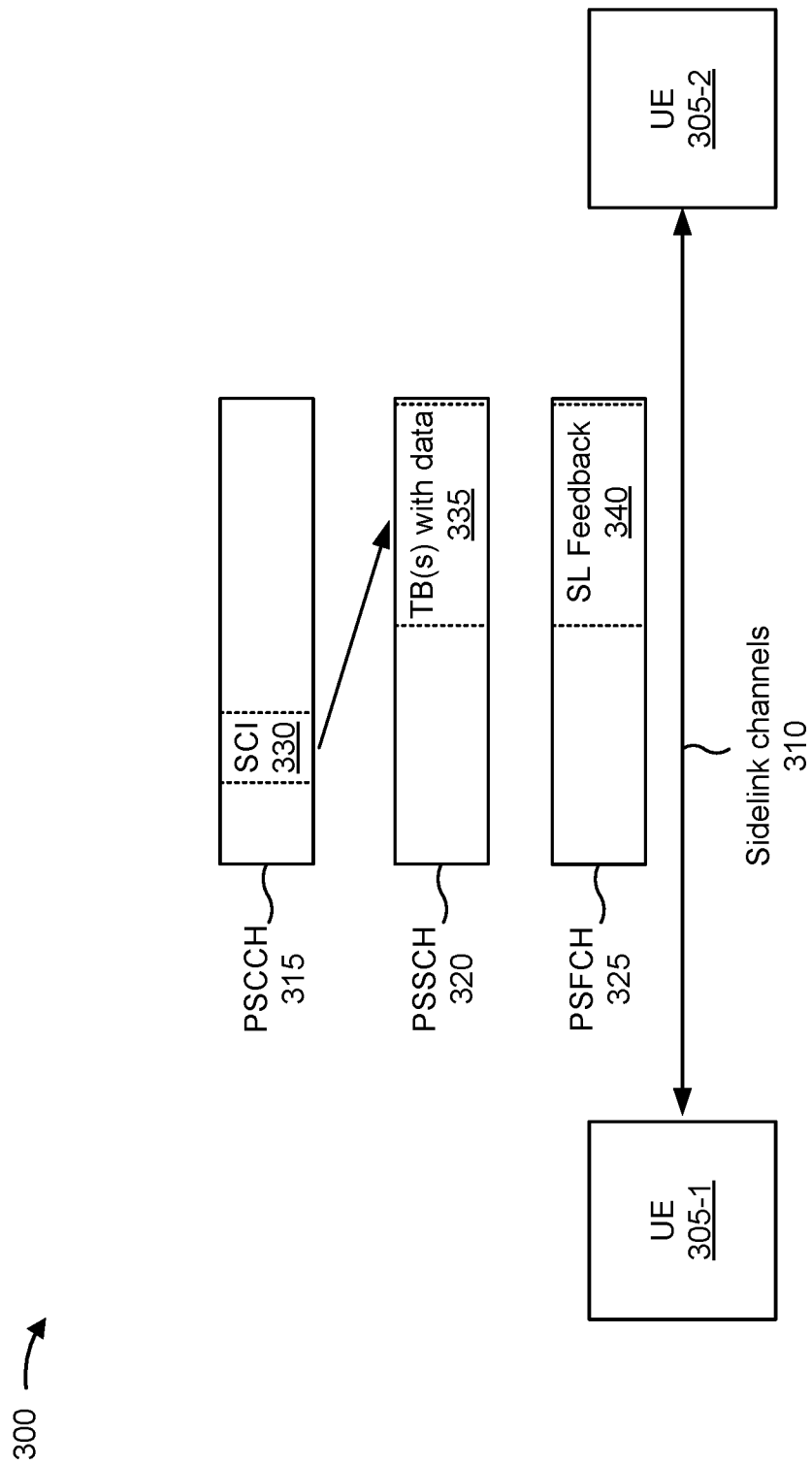
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-person (V2P) communications), and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, and/or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a PSFCH 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
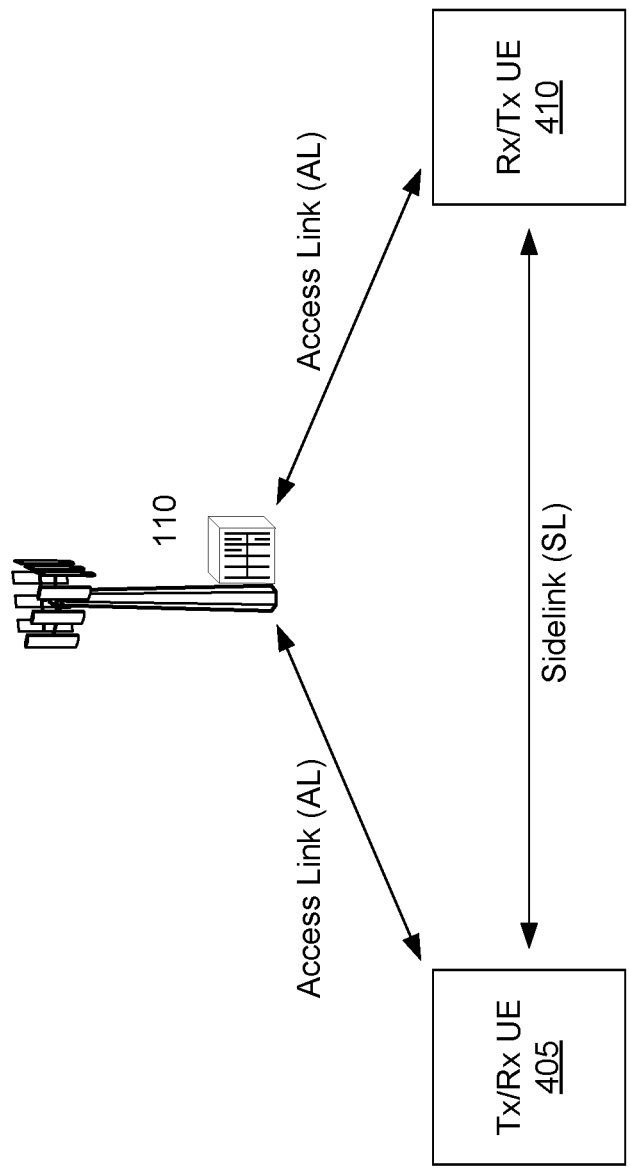
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

An LTE Mode 4 resource allocation for sidelink carrier aggregation may correspond to an NR Mode 2 resource allocation, in which autonomous transmissions may be performed via a sidelink channel via a sensing and reservation mechanism. From a physical layer perspective, up to eight sidelink (SL) component carriers (CCs) may be aggregated. Further, particular sidelink component carriers may be indicated by higher layers for a transmission and potential retransmission of data, such as a medium access control (MAC) protocol data unit (PDU).

A configuration for aggregated sidelink component carriers may be provided via the higher layers. A subset of the aggregated sidelink component carriers may be active in a UE at a given time depending on active applications executing on the UE. A mapping between a given sidelink component carrier and a given application may occur at higher layers. For example, for a given application, UEs may identify a set of sidelink component carriers activated for transmissions and/or receptions, with no handshaking or negotiation involved for the UEs. One application may be mapped to a single sidelink component carrier. In some cases, UEs with carrier aggregation and non-carrier aggregation capabilities may communicate with each other. Non-carrier aggregation UEs may support basic safety messages, which may be mapped to a sidelink component carrier that is shared by both non-carrier aggregation UEs and UEs having a carrier aggregation capability.

In an NR system, sidelink carrier aggregation may be associated with two separate operating modes. In a first operating mode, sidelink carrier aggregation may be set up and controlled by the network. In a second operating mode, sidelink carrier aggregation may be set up by peer UEs, such as other sidelink UEs.

In the NR system, sidelink carrier aggregation may be associated with one of several cast types, such as unicast, groupcast, or broadcast. With respect to unicast, one unicast session or multiple unicast sessions may be supported. For example, one relay UE may support multiple remote UEs in multiple unicast sessions.

Several differences exist between sidelink carrier aggregation in the LTE system versus sidelink carrier aggregation in the NR system. The LTE system may support broadcast but not unicast and groupcast, whereas the NR system may support unicast, groupcast, and broadcast. The LTE system may not support sidelink HARQ feedback, whereas the NR system may support sidelink HARQ feedback. The NR system may support the sidelink HARQ feedback for unicast and groupcast.

One bandwidth part may be configured with multiple transmit and receive sidelink resource pools. Each transmit sidelink resource pool may also be used for receptions. However, a given receive sidelink resource pool may not be used for transmissions. A PSFCH configuration may be per sidelink resource pool.

On a given bandwidth part, a plurality of sidelink resource pools (e.g., all sidelink resource pools) may have a same PSFCH configuration. As a result, when a UE is active on multiple sidelink resource pools, phase discontinuity due to non-aligned transmissions may not occur.

Figure 5:
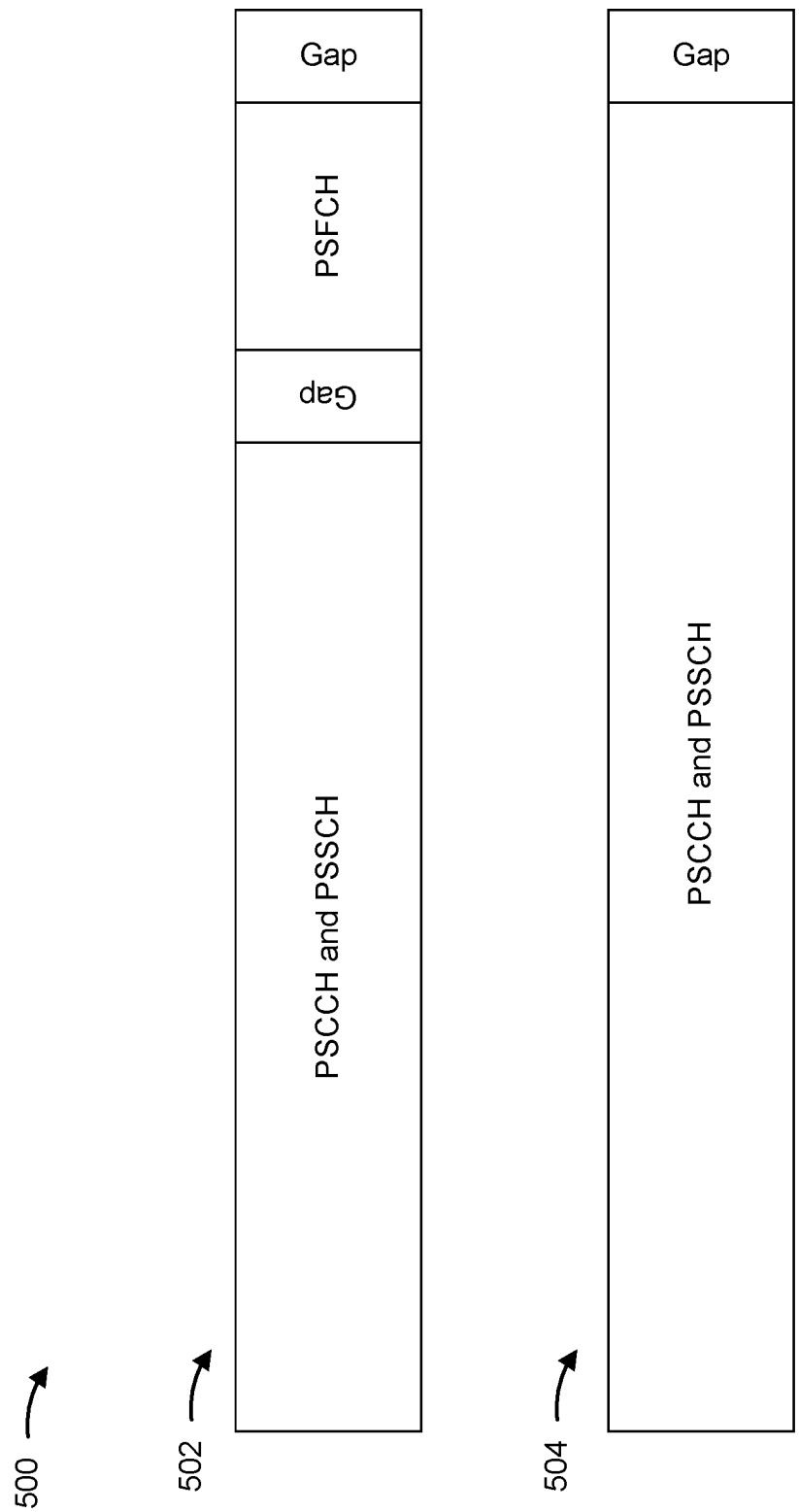
FIG. 5 is a diagram illustrating an example of sidelink channels, in accordance with the present disclosure.

FIG. 5 is a diagram illustrating an example 500 of sidelink channels, in accordance with the present disclosure.

As shown by reference number 502, a slot format with a PSCCH and a PSSCH may be associated with a plurality of resources in a time domain and a frequency domain. A PSFCH may be associated with a plurality of resources in the time domain and the frequency domain. The PSCCH and the PSSCH may not be separated by a gap. The PSCCH and the PSSCH may be separated by a gap with the PSFCH.

As shown by reference number 504, a slot format with a PSCCH and a PSSCH may be associated with a plurality of resources in a time domain and a frequency domain. The PSCCH and the PSSCH may not be separated by a gap. In this example, the slot format may not have a PSFCH.

As indicated above, FIG. 5 is provided as an example. Other examples may differ from what is described with regard to FIG. 5.

In a carrier aggregation scenario, a UE may perform simultaneous transmissions on multiple, intra-band sidelink component carriers. For example, a first UE may perform simultaneous sidelink communications on multiple, intra-band sidelink component carriers with a second UE. The sidelink communications may be via a PSFCH, a PSSCH, and/or a PSCCH. The first UE may shorten some sidelink transmissions in a non-PSFCH slot on one sidelink component carrier due to a simultaneous sidelink transmission of a different length on another, intra-band sidelink component carrier. The simultaneous transmission may be a PSFCH transmission or a PSSCH transmission in a PSFCH slot.

In some cases, a first slot associated with a first sidelink component carrier may not be associated with a PSFCH resource and a second slot associated with a second sidelink component carrier may be associated with a PSFCH, where a length of a PSCCH or a PSSCH associated with the first sidelink component carrier may be shortened to correspond to a length of the PSFCH of the second slot. In other words, while some slots may not be assigned with PSFCH resources associated with a given sidelink resource pool of a given sidelink component carrier, since other sidelink component carriers may have PSFCH resources, a PSCCH/PSSCH length on the other sidelink component carriers may be shortened as if the PSCCH/PSSCH are transmitted or received in PSFCH slots.

Figure 6:
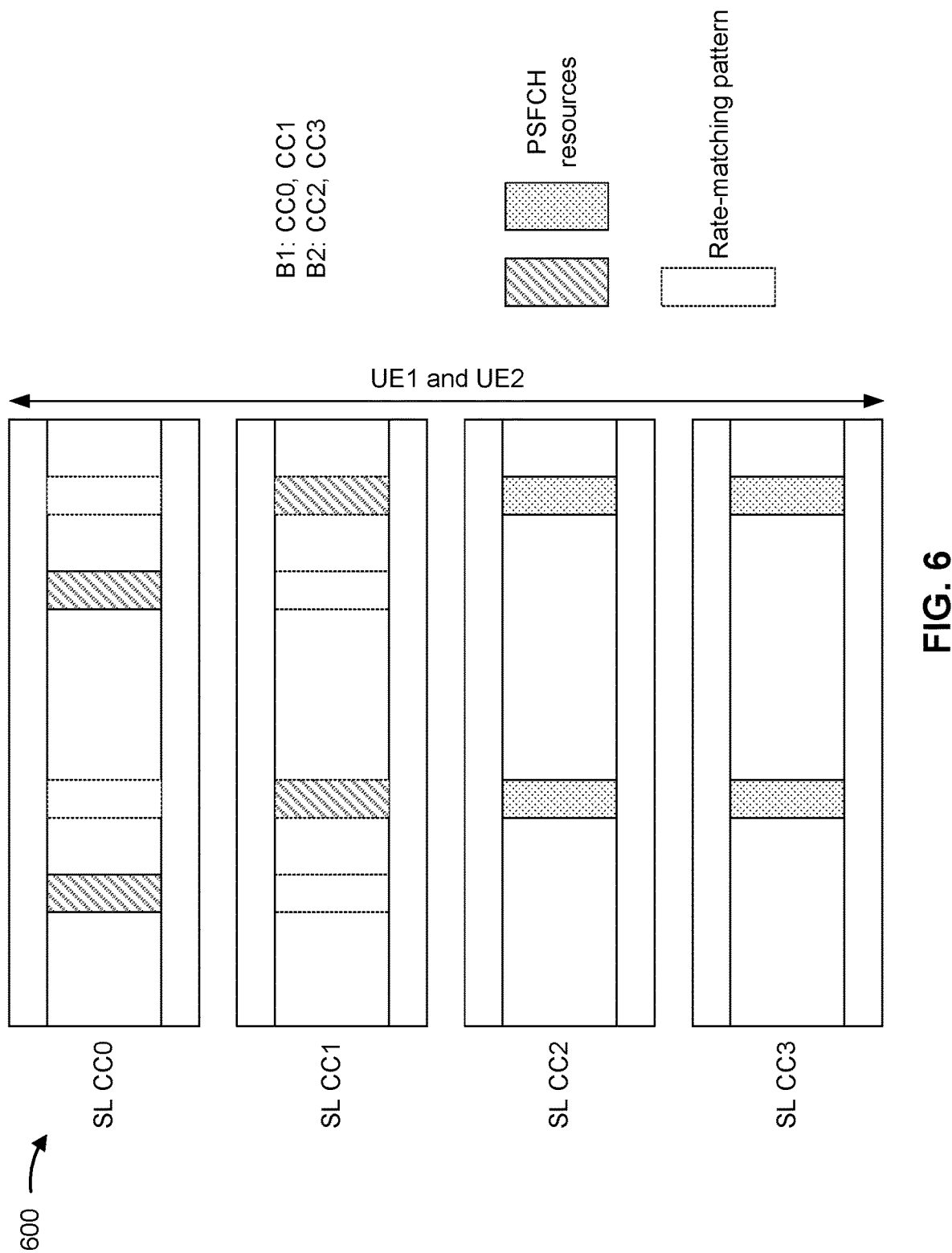
FIGS. 6-7 are diagrams illustrating examples of shortened transmissions in a non-physical sidelink feedback channel (non-PSFCH) slot, in accordance with the present disclosure.

FIG. 6 is a diagram illustrating an example 600 of shortened transmissions in a non-PSFCH slot, in accordance with the present disclosure.

As shown in FIG. 6, a first UE may perform sidelink communications with a second UE using a group of sidelink component carriers. The group of sidelink component carriers may include a first sidelink component carrier (SL CC0), a second component carrier (SL CC1), a third sidelink component carrier (SL CC2), and a fourth sidelink component carrier (SL CC3). The first and second sidelink component carriers may be associated with a first band (B1) and the third and fourth sidelink component carriers may be associated with a second band (B2).

The first UE may perform PSFCH transmissions using PSFCH resources on the first, second, third, and/or fourth sidelink component carriers. The first UE may simultaneously perform non-PSFCH transmissions in another sidelink component carrier. For example, the first UE may perform a PSFCH transmission on the first sidelink component carrier, and the second UE may simultaneously perform a non-PSFCH transmission on the second sidelink component carrier. The PSFCH transmission may be associated with a first length, and the non-PSFCH transmission may be associated with a second length. In this case, the first UE may shorten a length of the non-PSFCH transmission based at least in part on the length of the simultaneous PSFCH transmission.

The first UE may shorten non-PSFCH transmissions in accordance with a rate-matching pattern. The rate-matching pattern may be defined for the group of sidelink component carriers on a per sidelink intra-band component carrier basis. The rate matching pattern on one carrier (e.g., the first sidelink component carrier) may be a function of a PSFCH configuration on other aggregated carriers (e.g., the second sidelink component carrier, the third sidelink component carrier, and/or the fourth sidelink component carrier). The first UE may shorten the non-PSFCH transmissions in accordance with the rate-matching pattern to maintain an alignment between PSFCH slots and non-PSFCH slots across the sidelink component carriers, and not applying the rate-matching pattern may degrade a performance of the first UE and/or the second UE due to a lack of ability to maintain a phase coherence across non-aligned simultaneous transmissions.

For example, the rate matching pattern may be applied to the first and second sidelink component carriers associated with the first band, but a rate matching pattern may not be applied to the third and fourth sidelink component carriers associated with the second band.

As indicated above, FIG. 6 is provided as an example. Other examples may differ from what is described with regard to FIG. 6.

Figure 7:
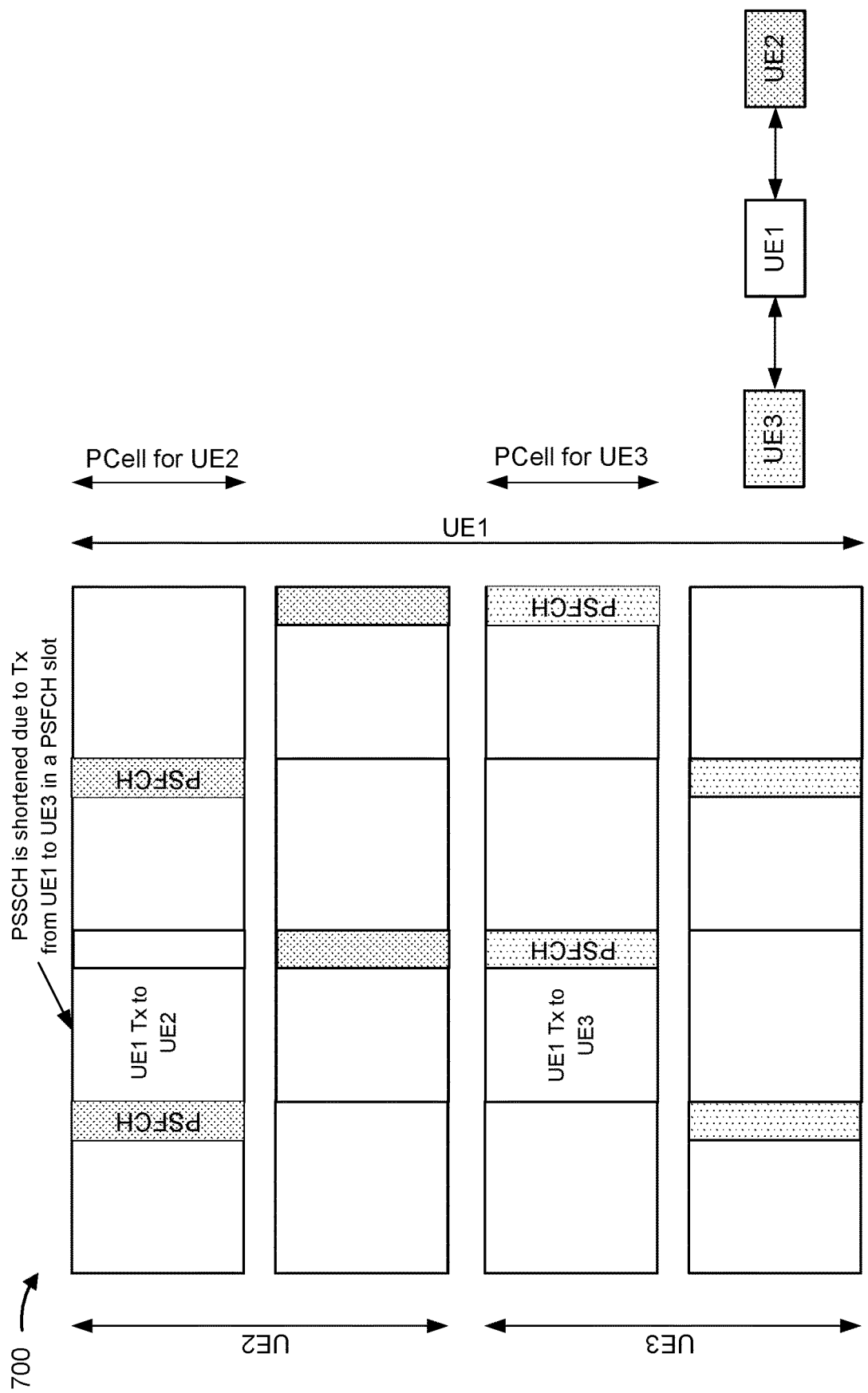

FIG. 7 is a diagram illustrating an example 700 of shortened transmissions in a non-PSFCH slot, in accordance with the present disclosure.

As shown in 7, a first UE may perform sidelink communications with a second UE and a third UE. The first UE may communicate with the second UE using a first primary cell associated with the second UE, and the first UE may communicate with the third UE using a second primary cell associated with the third UE. The first UE may simultaneously perform a PSSCH transmission to the second UE in a PSSCH slot (e.g., a non-PSFCH slot) and a PSFCH or PSSCH transmission to the third UE in a PSFCH slot. In this case, the first UE may shorten the PSSCH transmission to the second UE based at least in part on the simultaneous PSFCH or PSSCH transmission to the third UE.

As indicated above, FIG. 7 is provided as an example. Other examples may differ from what is described with regard to FIG. 7.

A Tx UE may need to shorten a transmission in a non-PSFCH slot on one carrier due to a simultaneous transmission (e.g., occurring at essentially a same time) of a different length (e.g., PSFCH or PSSCH in a PSFCH slot) on another, intra-band, sidelink component carrier. However, the Tx UE may be unaware of a configuration of non-PSFCH slots in which transmissions are to be shortened. Further, an Rx UE may need to decode shortened transmissions on non-PSFCH slots, and without an indication of a configuration of the shortened transmissions, the Rx UE may be unable to decode the shortened transmissions.

In various aspects of techniques and apparatuses described herein, the Tx UE and/or the Rx UE may receive an indication of a rate-matching pattern. The rate-matching pattern may indicate a slot index, a symbol, a carrier, and/or a resource pool on which the Tx UE is to shorten a sidelink transmission to have a shortened transmission length, and on which the Rx UE is to decode the sidelink transmission having the shortened transmission length. In some aspects, the Tx UE may receive the indication of the rate-matching pattern from the Rx UE and/or a base station. In some aspects, the Rx UE may receive the indication of the rate-matching pattern from the Tx UE and/or the base station. Based at least in part on the indication of the rate-matching pattern, the Tx UE may be able to perform the sidelink transmission having the shortened transmission length, and the Rx UE may be able to successfully decode the sidelink transmission having the shortened transmission length.

Figure 8:
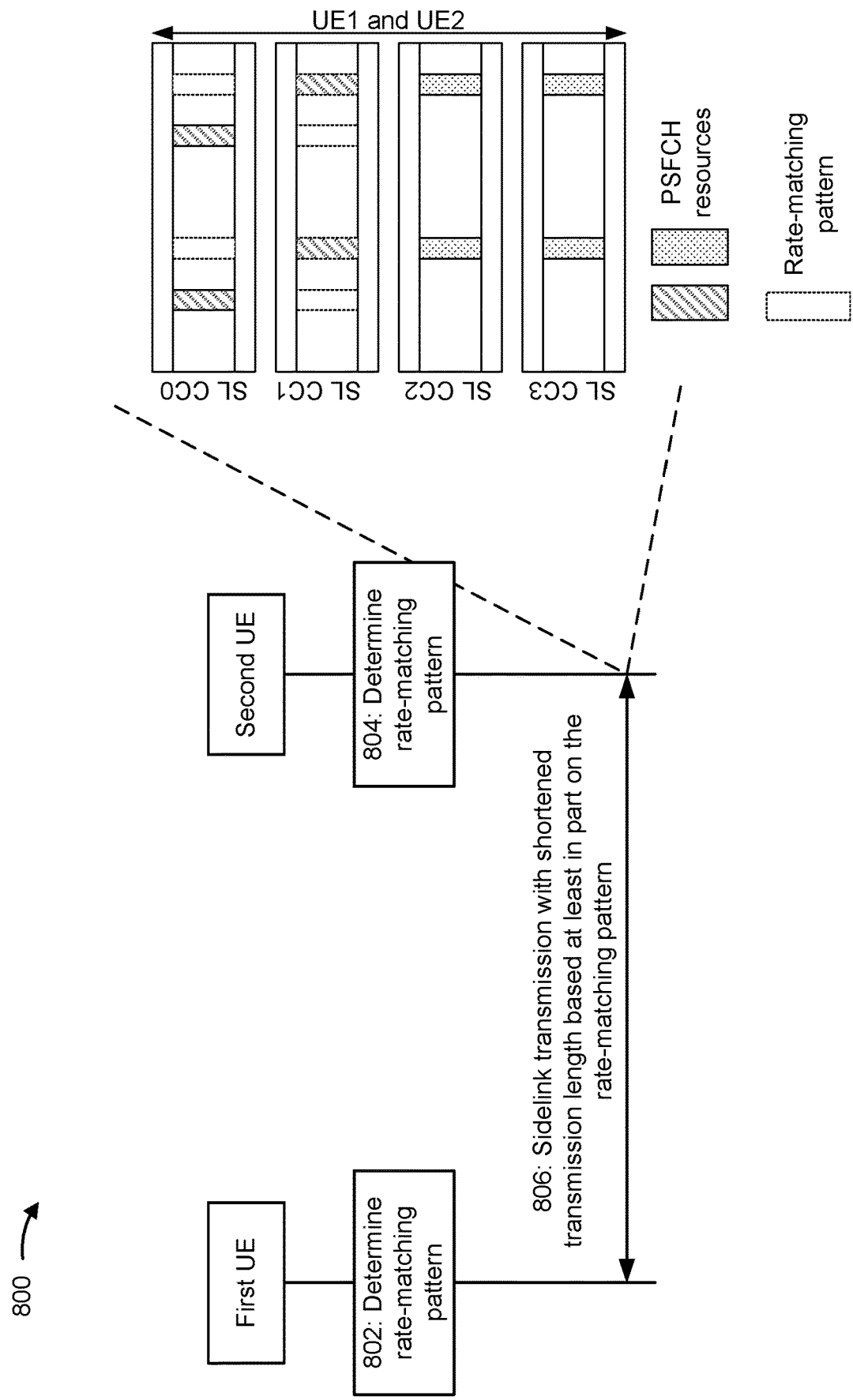
FIGS. 8-11 are diagrams illustrating examples associated with rate-matching pattern indications for sidelink carrier aggregation, in accordance with the present disclosure.

FIG. 8 is a diagram illustrating an example 800 associated with rate-matching pattern indications for sidelink carrier aggregation, in accordance with the present disclosure. As shown in FIG. 8, example 800 includes communication between a first UE (e.g., UE 120a) and a second UE (e.g., UE 120e). In some aspects, the first UE and the second UE may be included in a wireless network such as wireless network 100. The first UE and the second UE may communicate on a wireless sidelink.

As shown by reference number 802, the first UE (e.g., a Tx UE) may determine a rate-matching pattern associated with shortened transmission lengths for a plurality of sidelink component carriers in a sidelink carrier aggregation. The rate-matching pattern may indicate a slot index, a symbol, a carrier, and/or a resource pool on which the first UE is to shorten a sidelink transmission to have the shortened transmission length, and on which the second UE (e.g., an Rx UE) is to decode the sidelink transmission having the shortened transmission length.

In some aspects, the first UE may determine the rate-matching pattern based at least in part on receiving an indication of the rate-matching pattern from the second UE. In some aspects, the first UE may determine the rate-matching pattern based at least in part on receiving the indication of the rate-matching pattern from a base station.

As shown by reference number 804, the second UE may determine the rate-matching pattern associated with shortened transmission lengths for the plurality of sidelink component carriers in the sidelink carrier aggregation. In some aspects, the second UE may determine the rate-matching pattern based at least in part on receiving the indication of the rate-matching pattern from the first UE. In some aspects, the second UE may determine the rate-matching pattern based at least in part on receiving the indication of the rate-matching pattern from the base station.

As shown by reference number 806, the first UE may perform the sidelink transmission to the second UE with a shortened transmission length on a sidelink component carrier of the plurality of sidelink component carriers based at least in part on the rate-matching pattern. In some aspects, the sidelink transmission may be a PSFCH transmission. In some aspects, the sidelink transmission with the shortened transmission length may be based at least in part on another sidelink transmission on another sidelink component carrier that occurs simultaneously with the sidelink transmission and is associated with a different length as compared to the sidelink transmission. In this case, "simultaneously" may mean that the sidelink transmissions may occur at essentially a same time.

In some aspects, the first UE and the second UE may only communicate with each other. For example, the first UE and the second UE may not have other sidelink sessions with other UEs, and the first UE and the second UE may have no active communications with the base station (e.g., no Uu active communications). In this case, the first UE and the second UE may determine a PSFCH configuration on each of the sidelink component carriers aggregated between the first UE and the second UE. Further, the first UE and/or the second UE may determine whether/which sidelink component carriers are intra-band sidelink component carriers or inter-band sidelink component carriers.

As an example, the first UE and/or the second UE may identify a first sidelink component carrier (SL CC0), a second component carrier (SL CC1), a third sidelink component carrier (SL CC2), and a fourth sidelink component carrier (SL CC3), and that SL CC0 and SL CC1 are intra-band sidelink component carriers with a non-aligned PSFCH configuration. In this example, a rate-matching pattern, as shown in FIG. 8, may be set semi-statically between the first UE and the second UE. The rate-matching pattern may be set based at least in part on an indication received from a base station, or as part of a PC5 link setup between the first UE and the second UE. For example, the indication may be indicated by PC5 radio resource control (RRC) signaling.

As indicated above, FIG. 8 is provided as an example. Other examples may differ from what is described with regard to FIG. 8.

Figure 9:
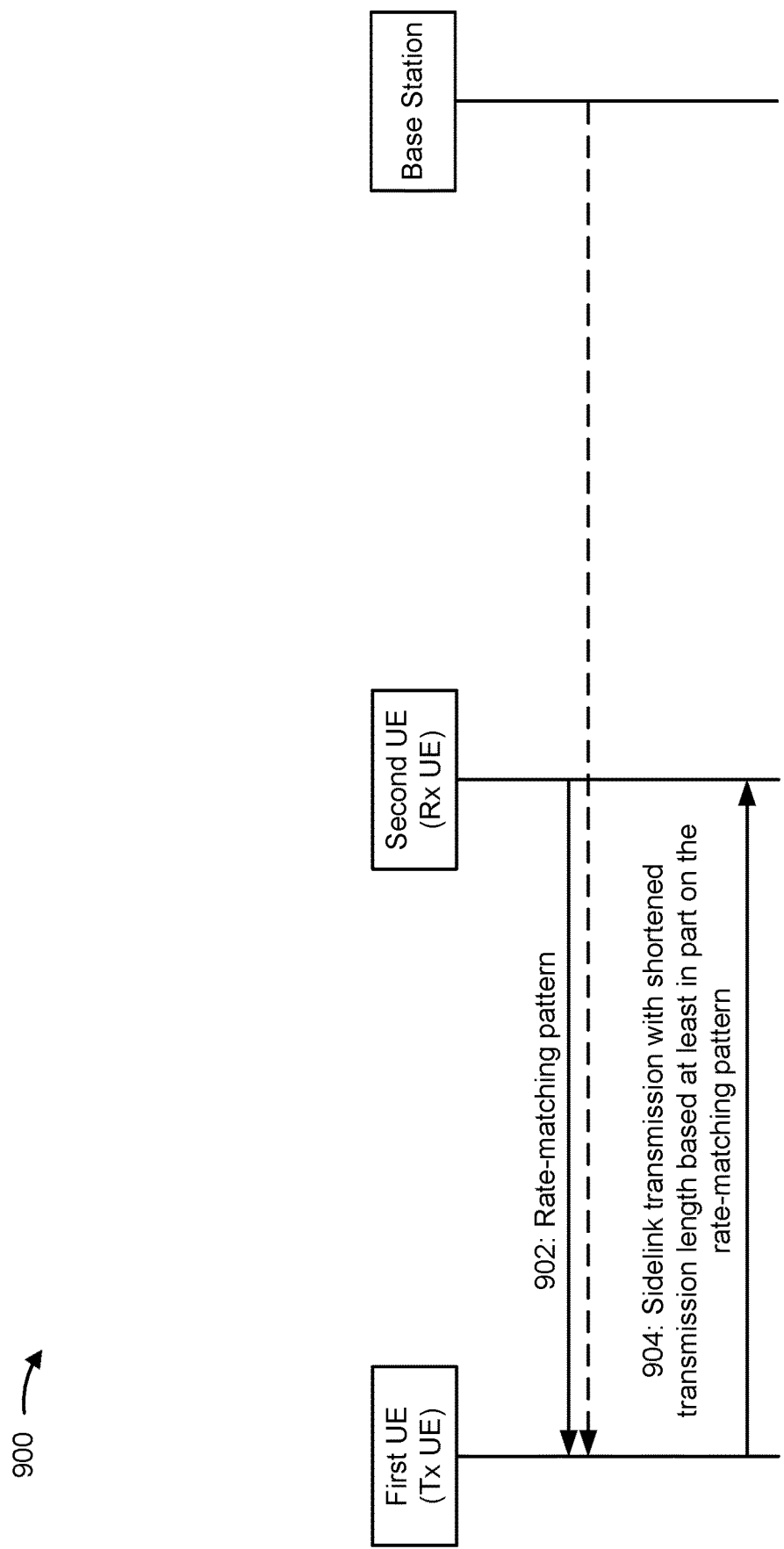

FIG. 9 is a diagram illustrating an example 900 associated with rate-matching pattern indications for sidelink carrier aggregation, in accordance with the present disclosure. As shown in FIG. 9, example 900 includes communication between a first UE (e.g., UE 120a), a second UE (e.g., UE 120e), and/or a base station (e.g., base station 11). In some aspects, the first UE, the second UE, and the base station may be included in a wireless network such as wireless network 100.

As shown by reference number 902, the first UE (e.g., a Tx UE) may receive, from the second UE (e.g., an Rx UE), an indication of a rate-matching pattern associated with shortened transmission lengths for a plurality of sidelink component carriers in a sidelink carrier aggregation. The rate-matching pattern may indicate a slot index, a symbol, a carrier, and/or a resource pool on which the first UE is to shorten a sidelink transmission to have the shortened transmission length, and on which the second UE is to decode the sidelink transmission having the shortened transmission length. In some aspects, the first UE may receive the indication from the second UE via a PC5 link setup between the first UE and the second UE.

In some aspects, the indication may be associated with a transmission on one carrier or multiple carriers in one slot.

Further, the indication may be for one transmission slot or may indicate that transmission(s) in multiple slots (e.g., which may include upcoming transmissions) are shortened. In other words, in addition to the indication being for a single or multiple sidelink component carriers or resource pools, the indication may be applied to one occasion of transmission (e.g., one slot) or multiple slots.

In some aspects, a pair or group of UEs that include the first UE and the second UE may determine the rate-matching pattern. The rate-matching pattern may be determined semi-statically or dynamically. For example, in a semi-static approach, the rate-matching pattern may be determined implicitly based at least in part on a PSFCH configuration of aggregated carriers, the rate-matching pattern may be determined explicitly by either the first UE or the second UE in the group of UEs, or the rate-matching pattern may be determined explicitly based at least in part on a joint negotiation between the first UE and the second UE.

In some aspects, the first UE may receive the indication of the rate-matching pattern from the base station. As an example, the first UE may receive the indication from the base station based at least in part on the first UE being in-coverage with the base station. As another example, the first UE may receive the indication from the base station via a third UE (e.g., a relay UE) based at least in part on the first UE being out-of-coverage with the base station. In some aspects, the first UE may receive, from the base station, the indication of the rate-matching pattern via a bit field in a downlink control information (DCI) format based at least in part on a Mode 1 resource allocation.

In some aspects, the base station may indicate the rate-matching pattern (e.g., slot index/symbol indices) and carriers/resource pools on which the first UE is to shorten a transmission and for which the second UE is to assume a shortened transmission. In some aspects, the indication from the base station may be a direct indication (e.g., when the first UE and/or the second UE are in-coverage), or the indication may be an indirect indication (e.g., when the first UE and/or the second UE are out-of-coverage and a relay UE is used). In some aspects, the indication from the base station may be semi-static or dynamic (e.g., as part of a sidelink scheduling Mode 1).

In some aspects, the indication of the rate-matching pattern may be associated with a semi-static indication. For example, the rate-matching pattern may be based at least in part on a PSFCH configuration for the plurality of sidelink component carriers and on whether the plurality of sidelink component carriers include intra-band sidelink component carriers or inter-band sidelink component carriers. For example, in a semi-static approach, the first UE and the second UE may determine the PSFCH configuration on each of the sidelink component carriers aggregated between the first UE and the second UE. Further, the first UE and/or the second UE may determine whether/which sidelink component carriers are intra-band sidelink component carriers or inter-band sidelink component carriers. Based at least in part on the determination of the PSFCH configuration and the intra-band or inter-band sidelink component carriers, the rate-matching pattern may be set semi-statically between the first UE and the second UE. The rate-matching pattern may be set based at least in part on the indication received from the base station, or as part of a PC5 link setup between the first UE and the second UE.

In some aspects, in the semi-static approach, the rate-matching pattern may be based at least in part on the PSFCH configuration, or the rate-matching pattern may be separately and independently defined.

In some aspects, the indication of the rate-matching pattern may be associated with a dynamic indication. The first UE may transmit, to the second UE, the indication of the rate-matching pattern along with the sidelink transmission via a bit field in SCI based at least in part on a Mode 2 resource allocation. For example, in a dynamic approach, the first UE may transmit, to the second UE, the indication to indicate that a transmission on a given carrier is shortened. For a Mode 1 resource allocation, the indication may be provided to the first UE by the base station (e.g., via a bit field in DCI format 3-X). For the Mode 2 resource allocation, the first UE may include the indication in the transmission to the second UE, where the indication notifies the second UE that the transmission on the given carrier is shortened. For example, the first UE may transmit the indication via a bit field in SCI, which may include SCI part 1 (SCI-1) or SCI part 2 (SCI-2).

In some aspects, the rate-matching pattern associated with the dynamic indication may be based at least in part on unicast communications between the first UE and the second UE and without other active sidelink communications between the first UE or the second UE with other UEs. In some aspects, the rate-matching pattern associated with the dynamic indication may be based at least in part on the first UE and the second UE communicating with other UEs via groupcast sessions.

In some aspects, the indication of the rate-matching pattern may be sidelink-component-carrier-specific. In some aspects, the indication of the rate-matching pattern may be associated with the plurality of sidelink component carriers based at least in part on the plurality of sidelink component carriers being intra-band sidelink component carriers. In other words, the indication may be transmitted separately for each sidelink component carrier, or the indication may be transmitted jointly for a quantity of sidelink component carriers (e.g., when the sidelink component carriers are intra-band).

In some aspects, the rate-matching pattern may be based at least in part on whether the first UE and the second UE are associated with a unicast session or a multicast session, band combinations for the sidelink carrier aggregation, a transmit/receive capability for the first UE and the second UE, whether the first UE and the second UE have a single sidelink session or multiple sidelink sessions, an application type, a cast type, and/or a service type. In other words, the rate-matching pattern may be determined by the first UE and/or the second UE establishing a PC5 link, and may be based on a cast type (e.g., dynamic for unicast and semi-static for groupcast), band combinations for sidelink carrier aggregation, Tx/Rx capability (e.g., a quantity of sidelink component carriers for reception and transmission of sidelink) for each UE, whether a UE has a single or multiple sidelink sessions, and/or an application or service type.

As shown by reference number 904, the first UE may perform the sidelink transmission to the second UE with a shortened transmission length on a sidelink component carrier of the plurality of sidelink component carriers based at least in part on the rate-matching pattern. In some aspects, the sidelink transmission may be a PSFCH transmission. In some aspects, the sidelink transmission with the shortened transmission length may be based at least in part on another sidelink transmission on another sidelink component carrier that occurs simultaneously with the sidelink transmission and is associated with a different length as compared to the sidelink transmission.

As indicated above, FIG. 9 is provided as an example. Other examples may differ from what is described with regard to FIG. 9.

Figure 10:
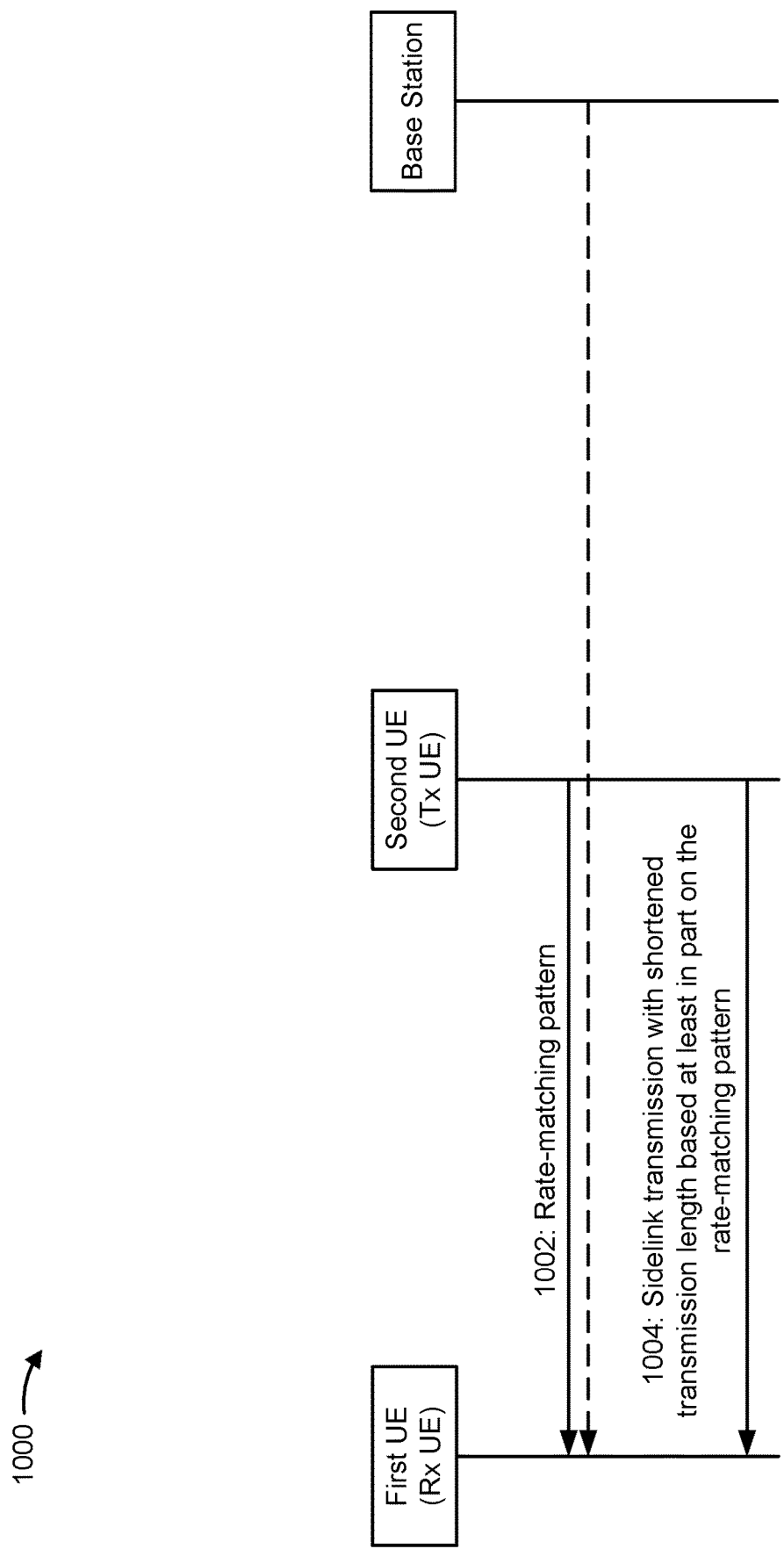

FIG. 10 is a diagram illustrating an example 1000 associated with rate-matching pattern indications for sidelink carrier aggregation, in accordance with the present disclosure. As shown in FIG. 10, example 1000 includes communication between a first UE (e.g., UE 120a), a second UE (e.g., UE 120e), and/or a base station (e.g., base station 11). In some aspects, the first UE, the second UE, and the base station may be included in a wireless network such as wireless network 100.

As shown by reference number 1002, the first UE (e.g., an Rx UE) may receive, from the second UE (e.g., a Tx UE), an indication of a rate-matching pattern associated with shortened transmission lengths for a plurality of sidelink component carriers in a sidelink carrier aggregation. The rate-matching pattern may indicate a slot index, a symbol, a carrier, and/or a resource pool on which the second UE is to shorten a sidelink transmission to have the shortened transmission length, and on which the first UE is to decode the sidelink transmission having the shortened transmission length. For example, the first UE, after receiving the indication, may assume that a PSSCH is shortened in accordance with the rate-matching pattern indicated by the second UE.

In some aspects, the first UE may receive the indication from the second UE via a PC5 link setup between the first UE and the second UE. In some aspects, the first UE may receive, from the second UE, the indication of the rate-matching pattern along with the sidelink transmission via a bit field in SCI based at least in part on a Mode 2 resource allocation.

In some aspects, the first UE may receive the indication of the rate-matching pattern from the base station. As an example, the first UE may receive the indication from the base station based at least in part on the first UE being in-coverage with the base station. As another example, the first UE may receive the indication from the base station via a relay UE based at least in part on the first UE being out-of-coverage with the base station.

As shown by reference number 1004, the first UE may receive, from the second UE, the sidelink transmission with a shortened transmission length on a sidelink component carrier of the plurality of sidelink component carriers based at least in part on the rate-matching pattern. In some aspects, the sidelink transmission may be a PSFCH transmission.

As indicated above, FIG. 10 is provided as an example. Other examples may differ from what is described with regard to FIG. 10.

Figure 11:
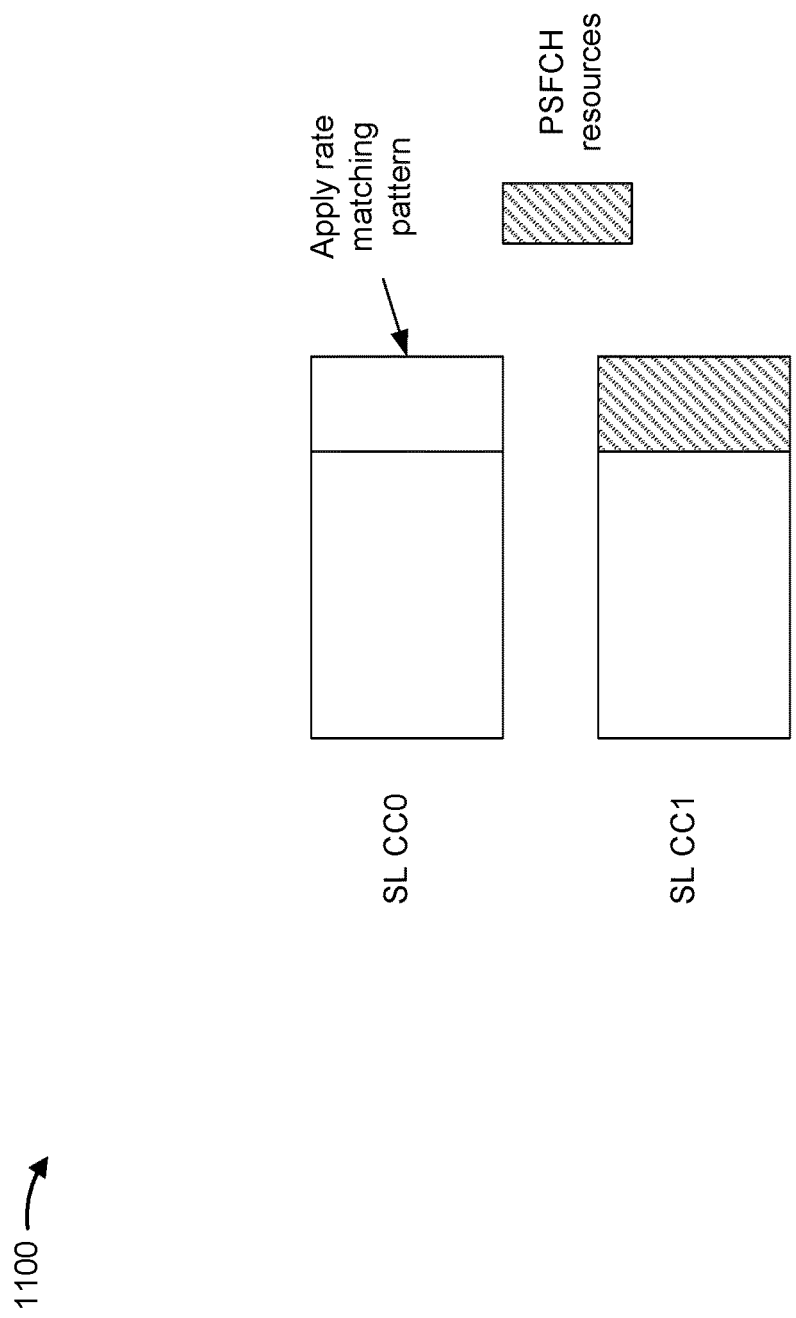

FIG. 11 is a diagram illustrating an example 1100 associated with rate-matching pattern indications for sidelink carrier aggregation, in accordance with the present disclosure.

As shown in FIG. 11, a first UE may be configured to communicate using a first sidelink component carrier (SL CC0) and a second sidelink component carrier (SL CC1). The first UE may determine whether to apply a rate-matching pattern on the first sidelink component carrier. When the first UE does not transmit a PSFCH on the second sidelink component carrier, then the first UE may not apply the rate-matching pattern on the first sidelink component carrier. However, a second UE should be notified on whether transmissions on the first sidelink component carrier by the first UE are rate matched or not.

As an example, the first UE may transmit a PSFCH (e.g., sidelink HARQ-ACK feedback) to the second UE and a PSSCH to a third UE. The first UE may have carrier aggregation with the second UE on a first sidelink component carrier and a second sidelink component carrier, but a single sidelink component carrier communication with the third UE. The first UE may not send the PSFCH to the second UE. In this case, the second UE may mistakenly determine that the PSSCH sent by the first UE on the first sidelink component carrier is not rate matched. However, the first UE may send a PSFCH to the third UE, which may create an issue between the first and second UEs. Therefore, an indication of whether rate matching is applied and/or the rate-matching pattern may be sent to the second UE and the third UE.

In some aspects, indicating the rate-matching pattern (e.g., a dynamic indication of the rate-matching pattern) may be enabled in unicast when two UEs have no other active sidelink communication with other UEs. In some aspects, indicating the rate-matching pattern may be enabled in a managed groupcast when a quantity of UEs communicate with each other. In other words, the rate-matching pattern may be indicated based at least in part on UEs having a single unicast session, at least one UE having multiple unicast sessions, or UEs involved in groupcast communication.

As indicated above, FIG. 11 is provided as an example. Other examples may differ from what is described with regard to FIG. 11.

Figure 12:
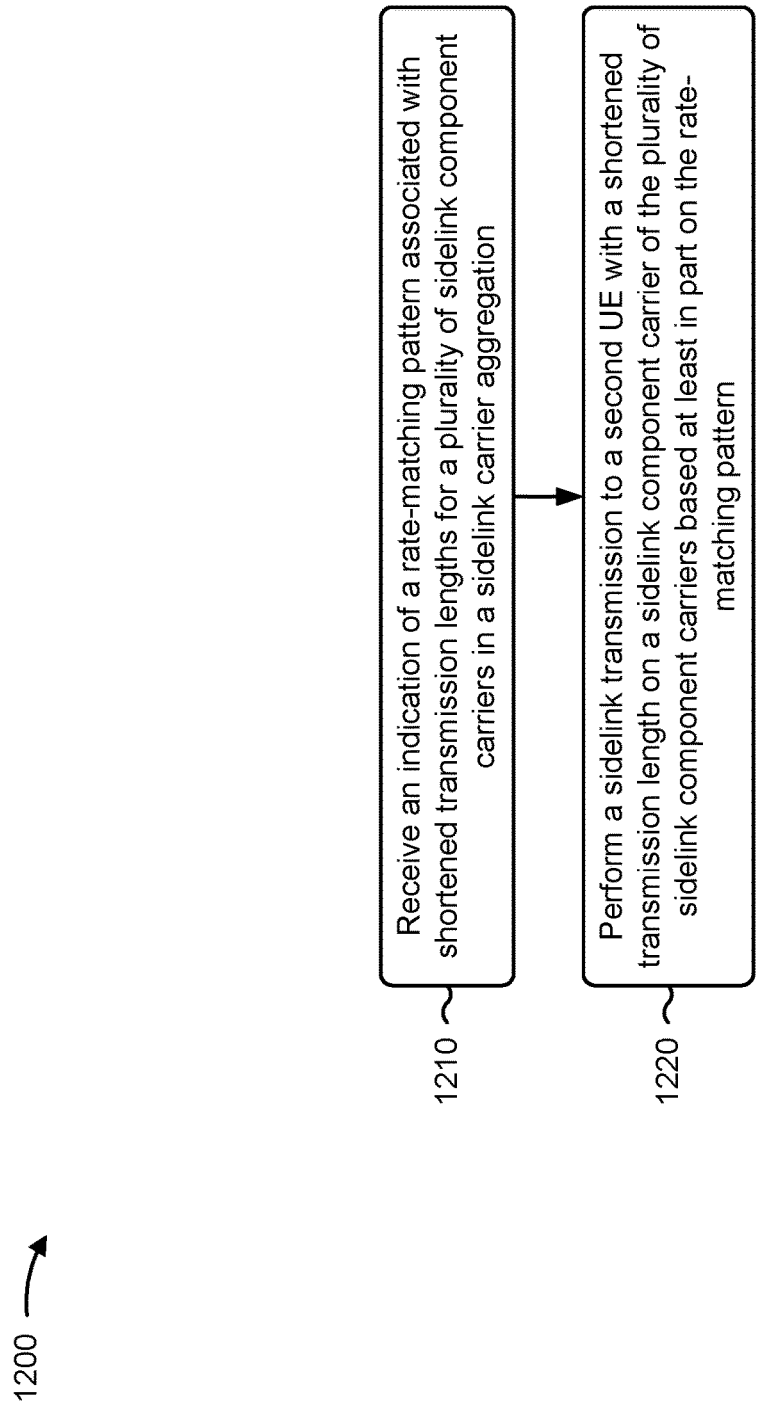
FIGS. 12-13 are diagrams illustrating example processes associated with rate-matching pattern indications for sidelink carrier aggregation, in accordance with present disclosure.

FIG. 12 is a diagram illustrating an example process 1200 performed, for example, by a first UE, in accordance with the present disclosure. Example process 1200 is an example where the first UE (e.g., UE 120a) performs operations associated with rate-matching pattern indications for sidelink carrier aggregation.

As shown in FIG. 12, in some aspects, process 1200 may include receiving an indication of a rate-matching pattern associated with shortened transmission lengths for a plurality of sidelink component carriers in a sidelink carrier aggregation (block 1210). For example, the first UE (e.g., using reception component 1402, depicted in FIG. 14) may receive an indication of a rate-matching pattern associated with shortened transmission lengths for a plurality of sidelink component carriers in a sidelink carrier aggregation, as described above.

As further shown in FIG. 12, in some aspects, process 1200 may include performing a sidelink transmission to a second UE with a shortened transmission length on a sidelink component carrier of the plurality of sidelink component carriers based at least in part on the rate-matching pattern (block 1220). For example, the first UE (e.g., using transmission component 1404, depicted in FIG. 14) may perform a sidelink transmission to a second UE with a shortened transmission length on a sidelink component carrier of the plurality of sidelink component carriers based at least in part on the rate-matching pattern, as described above.

Process 1200 may include additional aspects, such as any single aspect or any combination of aspects described below and/or in connection with one or more other processes described elsewhere herein.

In a first aspect, the rate-matching pattern indicates one or more of a slot index, a symbol, a carrier, or a resource pool on which the first UE is to shorten the sidelink transmission to have the shortened transmission length, and on which the second UE is to decode the sidelink transmission having the shortened transmission length.

In a second aspect, alone or in combination with the first aspect, the sidelink transmission is a physical sidelink feedback channel transmission, a physical sidelink control channel transmission, or a physical sidelink shared channel transmission.

In a third aspect, alone or in combination with one or more of the first and second aspects, the sidelink component carrier is a first sidelink component carrier and the sidelink transmission is a first sidelink transmission, and the first sidelink transmission with the shortened transmission length is based at least in part on a second sidelink transmission on a second sidelink component carrier that occurs simultaneously with the first sidelink transmission and is associated with a different length as compared to the first sidelink transmission.

In a fourth aspect, alone or in combination with one or more of the first through third aspects, receiving the indication of the rate-matching pattern comprises receiving the indication from a base station.

In a fifth aspect, alone or in combination with one or more of the first through fourth aspects, receiving the indication of the rate-matching pattern comprises receiving the indication from a base station via a third UE.

In a sixth aspect, alone or in combination with one or more of the first through fifth aspects, receiving the indication of the rate-matching pattern comprises receiving the indication from the second UE.

In a seventh aspect, alone or in combination with one or more of the first through sixth aspects, the indication of the rate-matching pattern is associated with one carrier or multiple carriers in one slot, and the indication of the rate-matching pattern is a semi-static indication or a dynamic indication.

In an eighth aspect, alone or in combination with one or more of the first through seventh aspects, the rate-matching pattern is based at least in part on a physical sidelink feedback channel configuration for the plurality of sidelink component carriers and on whether the plurality of sidelink component carriers are intra-band sidelink component carriers or inter-band sidelink component carriers.

In a ninth aspect, alone or in combination with one or more of the first through eighth aspects, receiving the indication of the rate-matching pattern comprises receiving the indication via a PC5 link setup between the first UE and the second UE.

In a tenth aspect, alone or in combination with one or more of the first through ninth aspects, the rate-matching pattern is based at least in part on unicast communications between the first UE and the second UE and without other active sidelink communications between the first UE, or the second UE, and other UEs.

In an eleventh aspect, alone or in combination with one or more of the first through tenth aspects, the rate-matching pattern is based at least in part on the first UE and the second UE communicating with other UEs via groupcast sessions.

In a twelfth aspect, alone or in combination with one or more of the first through eleventh aspects, receiving the indication of the rate-matching pattern comprises receiving, from a base station, the indication of the rate-matching pattern via a bit field in a downlink control information format based at least in part on a Mode 1 resource allocation.

In a thirteenth aspect, alone or in combination with one or more of the first through twelfth aspects, process 1200 includes transmitting, to the second UE, the indication of the rate-matching pattern along with the sidelink transmission via a bit field in sidelink control information based at least in part on a Mode 2 resource allocation.

In a fourteenth aspect, alone or in combination with one or more of the first through thirteenth aspects, the indication of the rate-matching pattern is sidelink-component-carrier-specific, or the indication is associated with the plurality of sidelink component carriers based at least in part on the plurality of sidelink component carriers being intra-band sidelink component carriers.

In a fifteenth aspect, alone or in combination with one or more of the first through fourteenth aspects, the rate-matching pattern is based at least in part on one or more of whether the first UE and the second UE are associated with a unicast session or a multicast session, band combinations for the sidelink carrier aggregation, a transmit/receive capability for the first UE and the second UE, whether the first UE and the second UE have a single sidelink session or multiple sidelink sessions, an application type, a cast type, or a service type.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
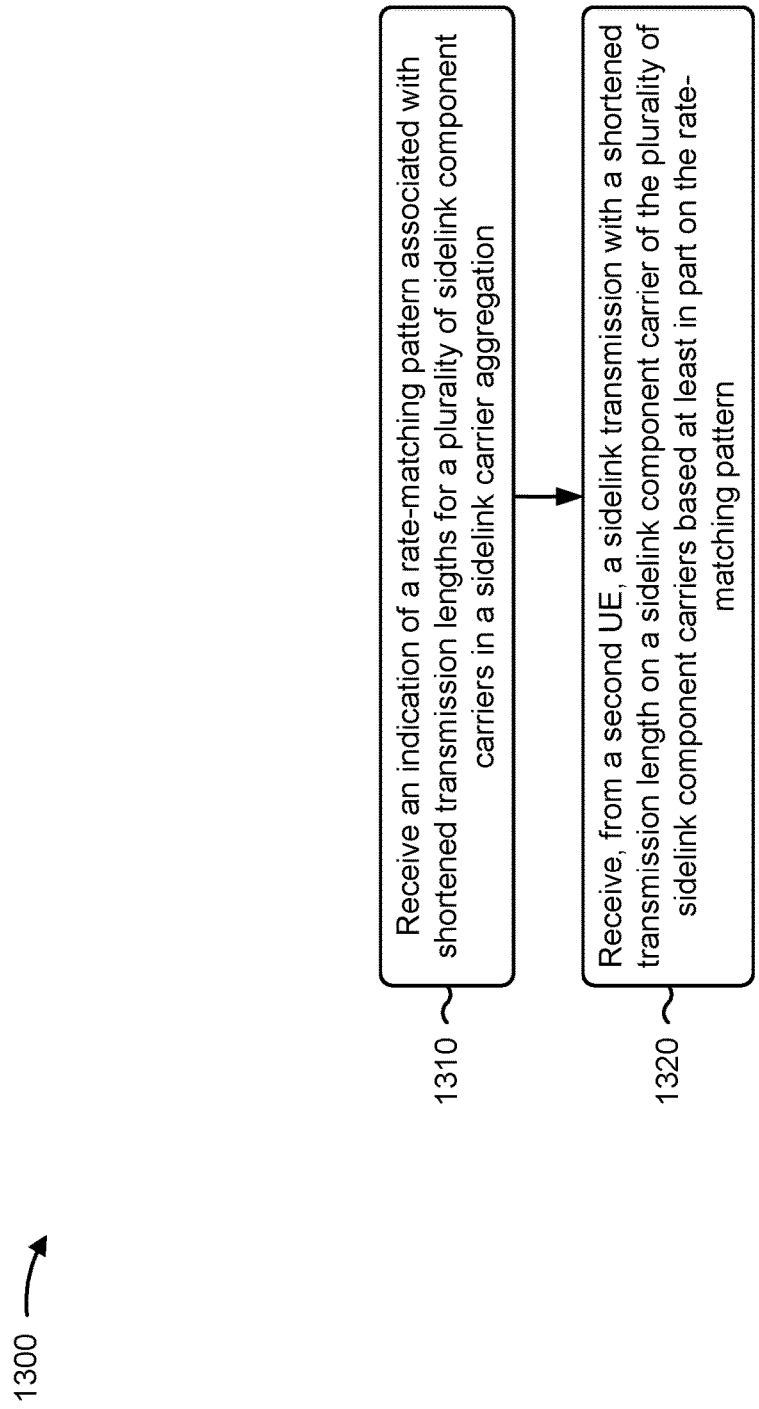

FIG. 13 is a diagram illustrating an example process 1300 performed, for example, by a first UE, in accordance with the present disclosure. Example process 1300 is an example where the first UE (e.g., UE 120a) performs operations associated with rate-matching pattern indications for sidelink carrier aggregation.

As shown in FIG. 13, in some aspects, process 1300 may include receiving an indication of a rate-matching pattern associated with shortened transmission lengths for a plurality of sidelink component carriers in a sidelink carrier aggregation (block 1310). For example, the UE (e.g., using reception component 1402, depicted in FIG. 14) may receive an indication of a rate-matching pattern associated with shortened transmission lengths for a plurality of sidelink component carriers in a sidelink carrier aggregation, as described above.

As further shown in FIG. 13, in some aspects, process 1300 may include receiving, from a second UE, a sidelink transmission with a shortened transmission length on a sidelink component carrier of the plurality of sidelink component carriers based at least in part on the rate-matching pattern (block 1320). For example, the UE (e.g., using reception component 1402, depicted in FIG. 14) may receive, from a second UE, a sidelink transmission with a shortened transmission length on a sidelink component carrier of the plurality of sidelink component carriers based at least in part on the rate-matching pattern, as described above.

Process 1300 may include additional aspects, such as any single aspect or any combination of aspects described below and/or in connection with one or more other processes described elsewhere herein.

In a first aspect, the rate-matching pattern indicates one or more of a slot index, a symbol, a carrier, or a resource pool on which the first UE is to shorten the sidelink transmission to have the shortened transmission length, and on which the second UE is to decode the sidelink transmission having the shortened transmission length.

In a second aspect, alone or in combination with the first aspect, receiving the indication of the rate-matching pattern comprises receiving the indication from a base station, or receiving the indication from the base station via a third UE.

In a third aspect, alone or in combination with one or more of the first and second aspects, the rate-matching pattern is based at least in part on a physical sidelink feedback channel configuration for the plurality of sidelink component carriers and on whether the plurality of sidelink component carriers are intra-band sidelink component carriers or inter-band sidelink component carriers.

In a fourth aspect, alone or in combination with one or more of the first through third aspects, receiving the indication of the rate-matching pattern comprises receiving the indication via a PC5 link setup between the first UE and the second UE.

In a fifth aspect, alone or in combination with one or more of the first through fourth aspects, the indication of the rate-matching pattern is received along with the sidelink transmission from the second UE via a bit field in sidelink control information based at least in part on a Mode 2 resource allocation.

In a sixth aspect, alone or in combination with one or more of the first through fifth aspects, the indication of the rate-matching pattern is sidelink component carrier-specific, or the indication is associated with the plurality of sidelink component carriers based at least in part on the plurality of sidelink component carriers being intra-band sidelink component carriers.

In a seventh aspect, alone or in combination with one or more of the first through sixth aspects, the rate-matching pattern is based at least in part on one or more of whether the first UE and the second UE are associated with a unicast session or a multicast session, band combinations for the sidelink carrier aggregation, a transmit/receive capability for the first UE and the second UE, whether the first UE and the second UE have a single sidelink session or multiple sidelink sessions, an application type, a cast type, or a service type.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
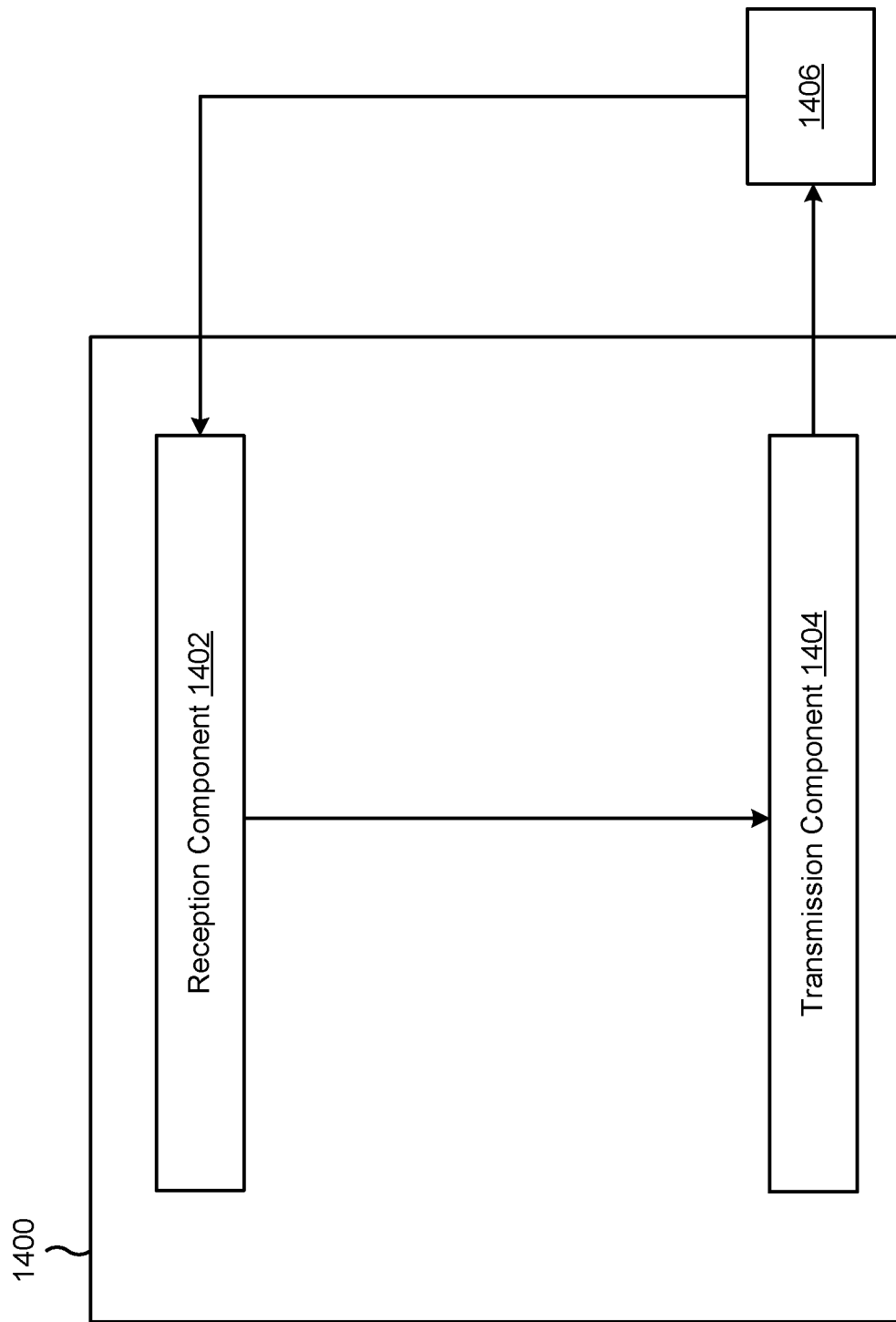
FIG. 14 is a block diagram of an example apparatus for wireless communication, in accordance with the present disclosure.

FIG. 14 is a block diagram of an example apparatus 1400 for wireless communication. The apparatus 1400 may be a first UE, or a first UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 8-11. Additionally, or alternatively, the apparatus 1400 may be configured to perform one or more processes described herein, such as process 1200 of FIG. 12, process 1300 of FIG. 13, or a combination thereof. In some aspects, the apparatus 1400 and/or one or more components shown in FIG. 14 may include one or more components of the first UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the first UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the first UE described above in connection with FIG. 2. In some aspects, the transmission component 1404 may be co-located with the reception component 1402 in a transceiver.

The reception component 1402 may receive an indication of a rate-matching pattern associated with shortened transmission lengths for a plurality of sidelink component carriers in a sidelink carrier aggregation. The transmission component 1404 may perform a sidelink transmission to a second UE with a shortened transmission length on a sidelink component carrier of the plurality of sidelink component carriers based at least in part on the rate-matching pattern. The transmission component 1404 may transmit, to the second UE, the indication of the rate-matching pattern along with the sidelink transmission via a bit field in sidelink control information based at least in part on a Mode 2 resource allocation.

The reception component 1402 may receive an indication of a rate-matching pattern associated with shortened transmission lengths for a plurality of sidelink component carriers in a sidelink carrier aggregation. The reception component 1402 may receive, from a second UE, a sidelink transmission with a shortened transmission length on a sidelink component carrier of the plurality of sidelink component carriers based at least in part on the rate-matching pattern.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a first user equipment (UE), comprising: receiving an indication of a rate-matching pattern associated with shortened transmission lengths for a plurality of sidelink component carriers in a sidelink carrier aggregation; and performing a sidelink transmission to a second UE with a shortened transmission length on a sidelink component carrier of the plurality of sidelink component carriers based at least in part on the rate-matching pattern.

Aspect 2: The method of Aspect 1, wherein the rate-matching pattern indicates one or more of: a slot index, a symbol, a carrier, or a resource pool on which the first UE is to shorten the sidelink transmission to have the shortened transmission length, and on which the second UE is to decode the sidelink transmission having the shortened transmission length.

Aspect 3: The method of any of Aspects 1 through 2, wherein the sidelink transmission is a physical sidelink feedback channel transmission, a physical sidelink control channel transmission, or a physical sidelink shared channel transmission.

Aspect 4: The method of any of Aspects 1 through 3, wherein the sidelink component carrier is a first sidelink component carrier and the sidelink transmission is a first sidelink transmission, and the first sidelink transmission with the shortened transmission length is based at least in part on a second sidelink transmission on a second sidelink component carrier that occurs simultaneously with the first sidelink transmission and is associated with a different length as compared to the first sidelink transmission.

Aspect 5: The method of any of Aspects 1 through 4, wherein receiving the indication of the rate-matching pattern comprises receiving the indication from a base station.

Aspect 6: The method of any of Aspects 1 through 5, wherein receiving the indication of the rate-matching pattern comprises receiving the indication from a base station via a third UE.

Aspect 7: The method of any of Aspects 1 through 6, wherein receiving the indication of the rate-matching pattern comprises receiving the indication from the second UE.

Aspect 8: The method of any of Aspects 1 through 7, wherein the indication of the rate-matching pattern is associated with one carrier or multiple carriers in one slot, and wherein the indication of the rate-matching pattern is a semi-static indication or a dynamic indication.

Aspect 9: The method of any of Aspects 1 through 8, wherein the rate-matching pattern is based at least in part on a physical sidelink feedback channel configuration for the plurality of sidelink component carriers and on whether the plurality of sidelink component carriers are intra-band sidelink component carriers or inter-band sidelink component carriers.

Aspect 10: The method of any of Aspects 1 through 9, wherein receiving the indication of the rate-matching pattern comprises receiving the indication via a PC5 link setup between the first UE and the second UE.

Aspect 11: The method of any of Aspects 1 through 10, wherein the rate-matching pattern is based at least in part on unicast communications between the first UE and the second UE and without other active sidelink communications between the first UE or the second UE with other UEs.

Aspect 12: The method of any of Aspects 1 through 11, wherein the rate-matching pattern is based at least in part on the first UE and the second UE communicating with other UEs via groupcast sessions.

Aspect 13: The method of any of Aspects 1 through 12, wherein receiving the indication of the rate-matching pattern comprises receiving, from a base station, the indication of the rate-matching pattern via a bit field in a downlink control information format based at least in part on a Mode 1 resource allocation.

Aspect 14: The method of any of Aspects 1 through 13, further comprising: transmitting, to the second UE, the indication of the rate-matching pattern along with the sidelink transmission via a bit field in sidelink control information based at least in part on a Mode 2 resource allocation.

Aspect 15: The method of any of Aspects 1 through 14, wherein: the indication of the rate-matching pattern is sidelink-component-carrier-specific; or the indication is associated with the plurality of sidelink component carriers based at least in part on the plurality of sidelink component carriers being intra-band sidelink component carriers.

Aspect 16: The method of any of Aspects 1 through 15, wherein the rate-matching pattern is based at least in part on one or more of: whether the first UE and the second UE are associated with a unicast session or a multicast session, band combinations for the sidelink carrier aggregation, a transmit/receive capability for the first UE and the second UE, whether the first UE and the second UE have a single sidelink session or multiple sidelink sessions, an application type, a cast type, or a service type.

Aspect 17: A method of wireless communication performed by a first user equipment (UE), comprising: receiving an indication of a rate-matching pattern associated with shortened transmission lengths for a plurality of sidelink component carriers in a sidelink carrier aggregation; and receiving, from a second UE, a sidelink transmission with a shortened transmission length on a sidelink component carrier of the plurality of sidelink component carriers based at least in part on the rate-matching pattern.

Aspect 18: The method of Aspect 17, wherein the rate-matching pattern indicates one or more of: a slot index, a symbol, a carrier, or a resource pool on which the first UE is to shorten the sidelink transmission to have the shortened transmission length, and on which the second UE is to decode the sidelink transmission having the shortened transmission length.

Aspect 19: The method of any of Aspects 17 through 18, wherein receiving the indication of the rate-matching pattern comprises: receiving the indication from a base station; or receiving the indication from the base station via a third UE.

Aspect 20: The method of any of Aspects 17 through 19, wherein the rate-matching pattern is based at least in part on a physical sidelink feedback channel configuration for the plurality of sidelink component carriers and on whether the plurality of sidelink component carriers are intra-band sidelink component carriers or inter-band sidelink component carriers.

Aspect 21: The method of any of Aspects 17 through 20, wherein receiving the indication of the rate-matching pattern comprises receiving the indication via a PC5 link setup between the first UE and the second UE.

Aspect 22: The method of any of Aspects 17 through 21, wherein the indication of the rate-matching pattern is received along with the sidelink transmission from the second UE via a bit field in sidelink control information based at least in part on a Mode 2 resource allocation.

Aspect 23: The method of any of Aspects 17 through 22, wherein: the indication of the rate-matching pattern is sidelink component carrier-specific; or the indication is associated with the plurality of sidelink component carriers based at least in part on the plurality of sidelink component carriers being intra-band sidelink component carriers.

Aspect 24: The method of any of Aspects 17 through 23, wherein the rate-matching pattern is based at least in part on one or more of: whether the first UE and the second UE are associated with a unicast session or a multicast session, band combinations for the sidelink carrier aggregation, a transmit/receive capability for the first UE and the second UE, whether the first UE and the second UE have a single sidelink session or multiple sidelink sessions, an application type, a cast type, or a service type.

Aspect 25: An apparatus for wireless communication at a device, comprising a processor; memory coupled with the processor; and instructions stored in the memory and executable by the processor to cause the apparatus to perform the method of one or more Aspects of Aspects 1-16.

Aspect 26: A device for wireless communication, comprising a memory and one or more processors coupled to the memory, the memory and the one or more processors configured to perform the method of one or more Aspects of Aspects 1-16.

Aspect 27: An apparatus for wireless communication, comprising at least one means for performing the method of one or more Aspects of Aspects 1-16.

Aspect 28: A non-transitory computer-readable medium storing code for wireless communication, the code comprising instructions executable by a processor to perform the method of one or more Aspects of Aspects 1-16.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 1-16.

Aspect 30: An apparatus for wireless communication at a device, comprising a processor; memory coupled with the processor; and instructions stored in the memory and executable by the processor to cause the apparatus to perform the method of one or more Aspects of Aspects 17-24.

Aspect 31: A device for wireless communication, comprising a memory and one or more processors coupled to the memory, the memory and the one or more processors configured to perform the method of one or more Aspects of Aspects 17-24.

Aspect 32: An apparatus for wireless communication, comprising at least one means for performing the method of one or more Aspects of Aspects 17-24.

Aspect 33: A non-transitory computer-readable medium storing code for wireless communication, the code comprising instructions executable by a processor to perform the method of one or more Aspects of Aspects 17-24.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 17-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving an indication of a rate-matching pattern associated with shortened transmission lengths for a plurality of sidelink component carriers in a sidelink carrier aggregation; and
   performing a sidelink transmission to a second UE with a shortened transmission length on a sidelink component carrier of the plurality of sidelink component carriers based at least in part on the rate-matching pattern and an alignment in a time domain between physical sidelink feedback channel (PSFCH) slots and non-PSFCH slots across the plurality of sidelink component carriers.

2. The method of claim 1, wherein the rate-matching pattern indicates one or more of: a slot index, a symbol, a carrier, or a resource pool on which the first UE is to shorten the sidelink transmission to have the shortened transmission length, and on which the second UE is to decode the sidelink transmission having the shortened transmission length.

3. The method of claim 1, wherein the sidelink transmission is a physical sidelink feedback channel transmission, a physical sidelink control channel transmission, or a physical sidelink shared channel transmission.

4. The method of claim 1, wherein the sidelink component carrier is a first sidelink component carrier and the sidelink transmission is a first sidelink transmission, and the first sidelink transmission with the shortened transmission length is based at least in part on a second sidelink transmission on a second sidelink component carrier that occurs simultaneously with the first sidelink transmission and is associated with a different length as compared to the first sidelink transmission.

5. The method of claim 1, wherein receiving the indication of the rate-matching pattern comprises receiving the indication from a base station.

6. The method of claim 1, wherein receiving the indication of the rate-matching pattern comprises receiving the indication from a base station via a third UE.

7. The method of claim 1, wherein receiving the indication of the rate-matching pattern comprises receiving the indication from the second UE.

8. The method of claim 1, wherein the indication of the rate-matching pattern is associated with one carrier or multiple carriers in one slot, and wherein the indication of the rate-matching pattern is a semi-static indication or a dynamic indication.

9. The method of claim 1, wherein the rate-matching pattern is based at least in part on a physical sidelink feedback channel configuration for the plurality of sidelink component carriers and on whether the plurality of sidelink component carriers are intra-band sidelink component carriers or inter-band sidelink component carriers.

10. The method of claim 1, wherein receiving the indication of the rate-matching pattern comprises receiving the indication via a PC5 link setup between the first UE and the second UE.

11. The method of claim 1, wherein the rate-matching pattern is based at least in part on unicast communications between the first UE and the second UE and without other active sidelink communications between the first UE, or the second UE, and other UEs.

12. The method of claim 1, wherein the rate-matching pattern is based at least in part on the first UE and the second UE communicating with other UEs via groupcast sessions.

13. The method of claim 1, wherein receiving the indication of the rate-matching pattern comprises receiving, from a base station, the indication of the rate-matching pattern via a bit field in a downlink control information format based at least in part on a Mode 1 resource allocation.

14. The method of claim 1, further comprising:
   transmitting, to the second UE, the indication of the rate-matching pattern along with the sidelink transmission via a bit field in sidelink control information based at least in part on a Mode 2 resource allocation.

15. The method of claim 1, wherein:
   the indication of the rate-matching pattern is sidelink-component-carrier-specific; or
   the indication is associated with the plurality of sidelink component carriers based at least in part on the plurality of sidelink component carriers being intra-band sidelink component carriers.

16. The method of claim 1, wherein the rate-matching pattern is based at least in part on one or more of: whether the first UE and the second UE are associated with a unicast session or a multicast session, band combinations for the sidelink carrier aggregation, a transmit/receive capability for the first UE and the second UE, whether the first UE and the second UE have a single sidelink session or multiple sidelink sessions, an application type, a cast type, or a service type.

17. A method of wireless communication performed by a first user equipment (UE), comprising:
   receiving an indication of a rate-matching pattern associated with shortened transmission lengths for a plurality of sidelink component carriers in a sidelink carrier aggregation; and
   receiving, from a second UE, a sidelink transmission with a shortened transmission length on a sidelink component carrier of the plurality of sidelink component carriers based at least in part on the rate-matching pattern and an alignment in a time domain between physical sidelink feedback channel (PSFCH) slots and non-PSFCH slots across the plurality of sidelink component carriers.

18. The method of claim 17, wherein the rate-matching pattern indicates one or more of: a slot index, a symbol, a carrier, or a resource pool on which the first UE is to shorten the sidelink transmission to have the shortened transmission length, and on which the second UE is to decode the sidelink transmission having the shortened transmission length.

19. The method of claim 17, wherein receiving the indication of the rate-matching pattern comprises:
   receiving the indication from a base station; or
   receiving the indication from the base station via a third UE.

20. The method of claim 17, wherein the rate-matching pattern is based at least in part on a physical sidelink feedback channel configuration for the plurality of sidelink component carriers and on whether the plurality of sidelink component carriers are intra-band sidelink component carriers or inter-band sidelink component carriers.

21. The method of claim 17, wherein receiving the indication of the rate-matching pattern comprises receiving the indication via a PC5 link setup between the first UE and the second UE.

22. The method of claim 17, wherein the indication of the rate-matching pattern is received along with the sidelink transmission from the second UE via a bit field in sidelink control information based at least in part on a Mode 2 resource allocation.

23. The method of claim 17, wherein:
the indication of the rate-matching pattern is sidelink component carrier-specific; or
the indication is associated with the plurality of sidelink component carriers based at least in part on the plurality of sidelink component carriers being intra-band sidelink component carriers.

24. The method of claim 17, wherein the rate-matching pattern is based at least in part on one or more of: whether the first UE and the second UE are associated with a unicast session or a multicast session, band combinations for the sidelink carrier aggregation, a transmit/receive capability for the first UE and the second UE, whether the first UE and the second UE have a single sidelink session or multiple sidelink sessions, an application type, a cast type, or a service type.

25. A first user equipment (UE) for wireless communication, comprising:
a memory; and
one or more processors coupled to the memory, the one or more processors configured to:
receive an indication of a rate-matching pattern associated with shortened transmission lengths for a plurality of sidelink component carriers in a sidelink carrier aggregation; and
perform a sidelink transmission to a second UE with a shortened transmission length on a sidelink component carrier of the plurality of sidelink component carriers based at least in part on the rate-matching pattern and an alignment in a time domain between physical sidelink feedback channel (PSFCH) slots and non-PSFCH slots across the plurality of sidelink component carriers.

26. The first UE of claim 25, wherein the rate-matching pattern indicates one or more of: a slot index, a symbol, a carrier, or a resource pool on which the first UE is to shorten the sidelink transmission to have the shortened transmission length, and on which the second UE is to decode the sidelink transmission having the shortened transmission length.

27. The first UE of claim 25, wherein the one or more processors, when receiving the indication of the rate-matching pattern, are configured to:
receive the indication from a base station;
receive the indication from a base station via a third UE; or
receive the indication from the second UE via a PC5 link setup between the first UE and the second UE.

28. A first user equipment (UE) for wireless communication, comprising:
a memory; and
one or more processors coupled to the memory, the one or more processors configured to:
receive an indication of a rate-matching pattern associated with shortened transmission lengths for a plurality of sidelink component carriers in a sidelink carrier aggregation; and
receive, from a second UE, a sidelink transmission with a shortened transmission length on a sidelink component carrier of the plurality of sidelink component carriers based at least in part on the rate-matching pattern and an alignment in a time domain between physical sidelink feedback channel (PSFCH) slots and non-PSFCH slots across the plurality of sidelink component carriers.

29. The first UE of claim 28, wherein the rate-matching pattern indicates one or more of: a slot index, a symbol, a carrier, or a resource pool on which the first UE is to shorten the sidelink transmission to have the shortened transmission length, and on which the second UE is to decode the sidelink transmission having the shortened transmission length.

30. The first UE of claim 28, wherein the one or more processors, when receiving the indication of the rate-matching pattern, are configured to:
receive the indication from a base station;
receive the indication from the base station via a third UE; or
receive the indication from the second UE via a PC5 link setup between the first UE and the second UE.

* * * * *